United States Patent
Ujvari (10) Patent No.: US 12,130,933 B2
(45) Date of Patent: Oct. 29, 2024

(54) AUTHENTICATION OF FILES

(71) Applicant: Microchip Technology Incorporated, Chandler, AZ (US)

(72) Inventor: Daniel Arthur Ujvari, Hauppauge, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/457,700

(22) Filed: Dec. 6, 2021

(65) Prior Publication Data

US 2022/0092201 A1 Mar. 24, 2022

Related U.S. Application Data (63) Continuation of application No. 16/221,037, filed on Dec. 14, 2018, now Pat. No. 11,210,413.

(Continued)

(51) Int. Cl.
*G06F 21/57* (2013.01)
*G06F 21/62* (2013.01)
(Continued)

(52) U.S. Cl.
CPC ........ *G06F 21/6209* (2013.01); *G06F 21/575* (2013.01); *H04L 9/0643* (2013.01); *H04L 9/0825* (2013.01); *H04L 9/3247* (2013.01)

(58) Field of Classification Search
CPC .... G06F 21/6209; G06F 21/575; G06F 21/57; G06F 21/64; H04L 9/0643; H04L 9/0825; H04L 9/3247; H04L 9/3242
See application file for complete search history.

(56) References Cited

U.S. PATENT DOCUMENTS 5,454,000 A 9/1995 Dorfman
8,364,965 B2 * 1/2013 Farrugia ............ G06F 16/2255
713/180

(Continued)

FOREIGN PATENT DOCUMENTS

CN 101443774 A 5/2009
CN 107534551 A 1/2018
(Continued)

OTHER PUBLICATIONS

"A Secure Perceptual Hash Algorithm for Image Content Authentication"—Weng et al, Catholic University Leuven, ESAT/COSIC-IBBT, Oct. 21, 2011 https://dl.ifip.org/db/conf/cms/cms2011/WengP11.pdf (Year: 2011).*

(Continued)

*Primary Examiner* — Randy A Scott
(74) *Attorney, Agent, or Firm* — TraskBritt (57) ABSTRACT

Systems for authenticating a file are disclosed. A system may include one or more physical devices. The one or more physical devices may select, based on an identifier, a subset of data segments of a computer file for generating a first digest with a cryptographic function. The one or more physical devices may also execute the cryptographic function on the selected subset of data segments of the computer file to generate the first digest. Further, the one or more physical devices may generate an authenticator based on the first digest and a private key. The one or more physical devices may further send the computer file, the identifier, and the authenticator to a secure node. Associated methods and non-transitory machine-readable medium are also disclosed.

16 Claims, 4 Drawing Sheets

Related U.S. Application Data (60) Provisional application No. 62/719,250, filed on Aug. 17, 2018.

(51) Int. Cl.
  *H04L 9/06* (2006.01)
  *H04L 9/08* (2006.01)
  *H04L 9/32* (2006.01)

(56) References Cited

U.S. PATENT DOCUMENTS

| | | | | |
|---|---|---|---|---|
| 8,886,947 | B2* | 11/2014 | Farrugia | G06F 21/64 380/37 |
| 9,195,851 | B1* | 11/2015 | Chandra | H04L 9/0825 |
| 2010/0031140 | A1* | 2/2010 | Cummins | G06F 21/64 715/236 |
| 2010/0088745 | A1* | 4/2010 | Song | H04L 63/123 718/1 |
| 2012/0005480 | A1 | 1/2012 | Batke et al. | |
| 2018/0152305 | A1 | 5/2018 | Jacquin et al. | |

FOREIGN PATENT DOCUMENTS

| | | | | | |
|---|---|---|---|---|---|
| CN | 107800688 | A | * | 3/2018 | G06F 21/645 |
| CN | 106708734 | B | * | 1/2020 | |
| EP | 1835432 | A1 | | 9/2007 | |
| EP | 1942431 | A1 | | 7/2008 | |

OTHER PUBLICATIONS

"Image Authentication for Digital Image Evidence"—Wen et al, Dept. of Forensic Science, Central Police University, Sep. 7, 2006 https://fsjournal.cpu.edu.tw/content/vol5.no.1/01(p1-p11).pdf (Year: 2006).*

"A Secure Perceptual Hash Algorithm for Image Content Authentication"—Weng et al, Katholieke Universiteit Leuven, ESAT/COSIC-IBBT, Oct. 2011 https://www.researchgate.net/publication/221521537 (Year: 2011).

"Image Authentication for Digital Image Evidence"—Wen et al, Department of Forensic Science, Central Police University, Sep. 7, 2006 http://fsjournal.cpu.edu.tw/content/vol5.no.1/01(p1-p11).pdf (Year: 2006).

International Search Report from International Application No. PCT/US19/046203, mailed on Oct. 24, 2019, 6 pages.

International Written Opinion from International Application No. PCT/US19/046203, mailed on Oct. 24, 2019, 7 pages.

Chinese First Office Action for Chinese Application No. 201980053496.X dated Sep. 29, 2023, 38 pages with translation.

Second Office Action and Search Report of Chinese Patent Application No. 201980053496.X issued Aug. 1, 2024, 23 pages with translation.

* cited by examiner

FIG. 1

|   |        |        |        |        |
|---|--------|--------|--------|--------|
| 1 | 8 Bits | 8 Bits | 8 Bits | 8 Bits |
| 2 | 8 Bits | 8 Bits | 8 Bits | 8 Bits |
| 3 | 8 Bits | 8 Bits | 8 Bits | 8 Bits |
| 4 | 8 Bits | 8 Bits | 8 Bits | 8 Bits |
| 5 | 8 Bits | 8 Bits | 8 Bits | 8 Bits |
| ⋮ |        |        |        |        |
| n-1 | 8 Bits | 8 Bits | 8 Bits | 8 Bits |
| n | 8 Bits | 8 Bits | 8 Bits | 8 Bits |

All Selected

AUTHENTICATION OF FILES

CROSS-REFERENCE TO RELATED APPLICATIONS

This application is a continuation of U.S. Patent Application Ser. No. 16/221,037, filed Dec. 14, 2018, now U.S. Patent 11,210,413, issued Dec. 28, 2021, which claims the benefit of U.S. Provisional Patent Application Ser. No. 62/719,250, filed Aug. 17, 2018 titled "DEVICES, SYSTEMS, AND RELATED METHOD FOR AUTHENTICATION OF APPLICATION IMAGES AND OTHER COMPUTER FILES," the disclosure of each of which is hereby incorporated herein in its entirety by this reference.

FIELD

The present disclosure relates, generally, to data authentication and, more particularly, to authenticating a file via performing a function on a subset of the file.

BACKGROUND

File authentication is often performed to verify the authenticity or other items dealing with the integrity of a file (e.g., inter-alia an application image, data file, or computer file). File integrity may be compromised via random corruption, such as faulty storage media, transmission errors, write errors, software bugs, etc., as well as by modification during transmission or storage by an untrusted party (e.g., inter-alia viruses or hacking). For this purpose, cryptographic functions (e.g., a hash function) are often employed to perform authentication on a file. Conventional authentication approaches may perform a hash of an entire computer file, which depending on the size of the computer file may affect user experience. To reduce authentication time and improve the user experience, conventional approaches may include pre-hashing a computer file and storing the resulting digest for use during authentication. These approaches may introduce a vulnerability to an attack by an untrusted party, who may hack the computer file (e.g., application image) or completely replace the computer file and supply the valid digest when authentication is to occur.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

Any characterization in this disclosure of something as 'typical,' 'conventional,' or 'known' does not necessarily mean that it is disclosed in the prior art or that the discussed aspects are appreciated in the prior art. Nor does it necessarily mean that, in the relevant field, it is widely known, well-understood, or routinely used.

In accordance with common practice, the various features illustrated in the drawings may not be drawn to scale. The illustrations presented herein are not meant to be actual views of any particular apparatus (e.g., device or system) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

Some authentication systems and methods include hashing an entire file (e.g., application image) at a microcontroller to generate a digest, which may be used to generate an authenticator (e.g., a message authentication code (MAC) and/or a digital signature) of the file. In these systems and methods, the entire file, along with the authenticator, may be sent from the microcontroller to a cryptography element. Upon receipt of the file and the authenticator, the cryptography element may hash the entire file to generate a second digest of the file. Further, the cryptography element may use the second digest and a public key (e.g., an original equipment manufacturer (OEM) public key) to verify the authenticator and authenticate the file.

For both symmetric and asymmetric file authentication, a "measure" of a file (also referred to herein as a "measurement method") may be required for file authentication. The time required for a measurement method (e.g., performing a cryptographic function, such as a hash function) may be a significant portion of the total time required for file authentication. Some files (e.g., application images) may be large and, therefore, some file authentication methods, such as described above, may require a substantial amount of time, thus affecting user experience. Therefore, other, less secure methods have been used. For example, some file authentication methods may pre-store a digest at a microcontroller and/or the microcontroller may execute a high-speed hash on a file (e.g., an application image). However, as indicated above, in these conventional methods, the digest is vulnerable to hacking, as is the unprotected microcontroller that includes the digest. An adversary may hack the file and/or replace the file and supply a valid digest for file authentication.

Various embodiments of the disclosure relate to authenticating a file (e.g., application images, computer file, data file, or any other suitable file) based on a subset of the file, rather than the entire file. More specifically, various embodiment relate to authenticating a file via performing a function on a subset of data segments (e.g., bytes) of a file (i.e., rather than performing the function on the entire file). The subset of the file may be selected such that it may be infeasible to modify the essence of the file while still successfully authenticating the file.

Yet more specifically, according to some embodiments, a microcontroller may select a subset of a file (e.g., a subset of the bytes of the file) based on an identifier (e.g., a secret identifier). Further, the microcontroller may perform a function (e.g., a cryptographic function such as a hash function) on the subset of the file (e.g., an application image) to generate a digest, which may be used to generate an authenticator. For example, rather than hashing every byte in a file to generate a digest, a subset of one or more words (e.g., each long word) in a file (e.g., an application image) may be hashed to generate a digest, which may be used to generate an authenticator. Further, upon receipt of the file, a cryptography element may attempt to authenticate the file. More specifically, the cryptography element may perform the function on the subset of the file to generate a second digest, which may be used along with a public key to verify the authenticator and authenticate the file.

Although various embodiments described herein refer to a hash function (and its resulting digest) as a measurement method, the disclosure is not so limited, and other measurement methods are within the scope of the present disclosure. As non-limiting examples, a measurement method may include and/or be based on a HMAC (e.g., using a hash based message authentication code using a secret key), a CMAC (e.g., using a message authentication code), or any other suitable method.

Compared to conventional authentication methods, various embodiments may significantly reduce an amount of time required for file authentication while maintaining an adequate level of security. In one example, if every fourth byte of a file (e.g., an application image) is selected to be hashed, the time required to generate a digest may be reduced by 75%. In these and other embodiments, critical data bytes that are embedded in the code may be considered. For example, in addition to selecting every fourth byte, one or more critical data bytes may be selected to be hashed. As another example, one or more critical data bytes may be taken into account to determine a repeatable pattern of data segments to select. Critical data bytes may be identified.

In another example, for authenticating an application image for a 32-bit processor, a hash portion of the authentication may be reduced by, for example, 66% or more. Higher percentages may be possible (e.g., if the selected subset of the file used is derived from an evaluation of code rather than done automatically). In these and other embodiments, the speed of an authentication process may be improved. However, the speed of the authentication process may vary depending on the contents of the file being authenticated.

For at least these reasons, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

For convenience, some examples provided herein refer to the authentication of an application image but it should be understood that any type of computer file (e.g., inter-alia text files, camera image files, audio files, video files or databases) may be authenticated in a similar manner according to various embodiments of the disclosure. In addition, some examples herein may refer to a hash function but it should be understood that other types of cryptographic functions are also contemplated and included within embodiments of the disclosure for both symmetric and asymmetric authentication methods.

A "computer" can mean microcontroller and/or a microcontroller and an embedded system that it operates. A "computer file" may be defined to as electronic and machine-readable, and embedded code (executable instructions and data) may be an example of a computer file. Further, some examples herein are described as being implemented, at least partially, by a microcontroller. Such examples are non-limiting and may also be performed by any type of processor operating in conjunction with a memory, including a microprocessor, digital-signal-processor (DSP), combinational logic and memory implementing a state machine, or field-programmable gate array (FPGA), or performed in a computer, embedded system, or other similar system or device.

Figure 1:
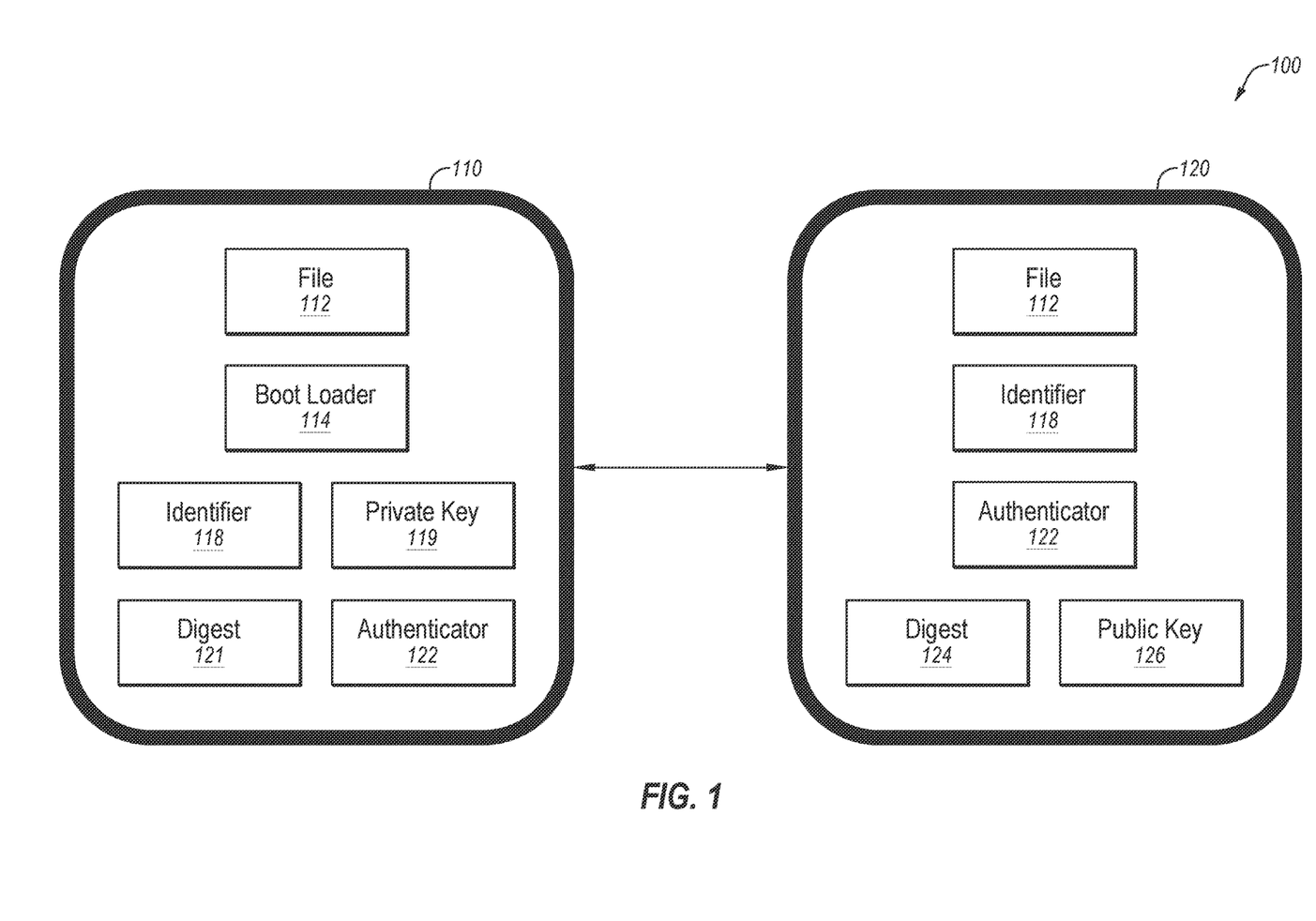
FIG. 1 is a simplified schematic block diagram of a system configured to authenticate a file, according to one or more embodiments of the disclosure.

FIG. 1 is a simplified schematic block diagram of a system 100 configured to authenticate a computer file, according to various embodiments of the disclosure. In some embodiments, the authentication of the computer file may be performed during a secure boot up, a firmware update, or other setting in which verification of the computer file may be desired. The computer file may be an application image or any other file, such as a data file.

The system 100, which may include a cryptographic system, includes a device 110 and a device 120. For example, device 110, which may also be referred to herein as a "microcontroller," may include a file 112 and a boot loader 114. Microcontroller 110, which may include a processor (e.g., processor 510 of FIG. 5) may also include other computer files stored thereon (not shown in FIG. 1). As a non-limiting example, computer file 112 may include, and may also be referred to herein as, an "application image."

Device 120, which may also be referred to herein as a "cryptography element" or a "secure node," may comprise a secure element (e.g., a secure cryptoprocessor) configured to perform authentication (also referred to herein as "verification") of a computer file, which, in this example, includes a copy of the application image 112. In some embodiments, the cryptography element 120 may be separate (e.g., a separate integrated circuit) from the microcontroller 110, whereas in other embodiments the cryptography element 120 and the microcontroller 110 may be fabricated on the same integrated circuit with the cryptography element 120 being configured in a secured region.

While conventional methods may utilize the entire application image 112 for authentication, as noted above, some embodiments of the disclosure may include selecting a subset of the application image 112 (e.g., a subset of data segments of the application image 112) to be used for authentication. In some embodiments, the entire application image 112, along with an identifier 118 that may be used to select the subset of the application image 112, may be sent (e.g., via a secure message) from microcontroller 110 to the cryptography element 120. In other embodiments, an authenticator, and the subset of the application image 112 may be sent (e.g., via a secure message) to the cryptography element 120.

As will be described more fully herein, system 100, and more specifically, for example, microcontroller 110 may be configured to determine the identifier 118, which may be used to select a subset of data segments of the application image 112 that may be used for authentication. As described more fully below, the identifier 118 may identify and/or may be based on inter-alia an algorithm, a repeatable pattern, or a random number, without limitation.

Further, according to various embodiments, the microcontroller 110 may perform a function (e.g., a cryptographic function, such as a hash function) on the selected subset of data segments of the application image 112 to generate a first digest 121 signed by private key (e.g., an OEM private key) 119 to create an authenticator 122. Further, the microcontroller 110 may send the application image 112, the authenticator 122, and the identifier 118 to the cryptography element 120.

Various embodiments may include authentication for symmetric and/or asymmetric cryptography. Accordingly, for example, authenticator 122 may include message authentication code (MAC) and/or a digital signature. In some embodiments, a digital signature may be used to verify the integrity of a message integrity and a sender's (i.e., the message sender) identity. MACs are symmetric, and MACs may use the same key for generation and verification (e.g., the same key may be used to generate the MAC and to verify the MAC). Digital signatures are asymmetric, and digital signatures may use a private key for generation and a public key for verification (e.g., a private key may be used generate the signature and a public key may be used verify the signature).

The cryptography element 120 may receive the application image 112, the identifier 118, and the authenticator 122 from the microcontroller 110. Using the identifier 118, the cryptography element 120 may determine the selected subset of data segments of the application image 112, and perform a cryptographic function on the subset of data segments to generate a second digest 124 (e.g., a second hash). Further, the cryptography element 120 may perform an authentication of the application image 112 via verification of the authenticator 122 based on the second digest 124 and a public key (e.g., OEM public key) 126. According to at least some embodiments, authenticators (e.g., signatures) and public keys may be securely stored (e.g., within the cryptography element 120).

As noted above, a subset of the computer file 112 may be determined based on the identifier (also referred to herein as a "secret identifier") 118, which may identify and/or be based on, inter-alia, a repeatable pattern, a random number, a pseudorandom distribution, or an algorithm. More specifically, the identifier 118, which may be determined by, for example, the system 100 (e.g., the microcontroller 110), may be indicative of how a subset of a file is determined (e.g., via an algorithm, via a repeatable pattern, or via a random number). Stated another way, the identifier 118 is indicative of which data segments are selected as the subset of a file.

The identifier may be a secret such that an adversary may not be able to determine which data segments are selected as the subset of the file.

According to some embodiments, the identifier 118 may be known to the cryptography element 120 in order to perform authentication. For example, the identifier 118 may be sent from the microcontroller 110 to the cryptography element 120. In some embodiments, the identifier 118 may be used more than once over the course of authenticating multiple computer files, and thus is not uniquely associated with each instance of computer file 112. In some embodiments, a new identifier 118 may be generated each time a new computer file is to be authenticated, and then is uniquely associated with each instance of computer file 112.

Figure 2:
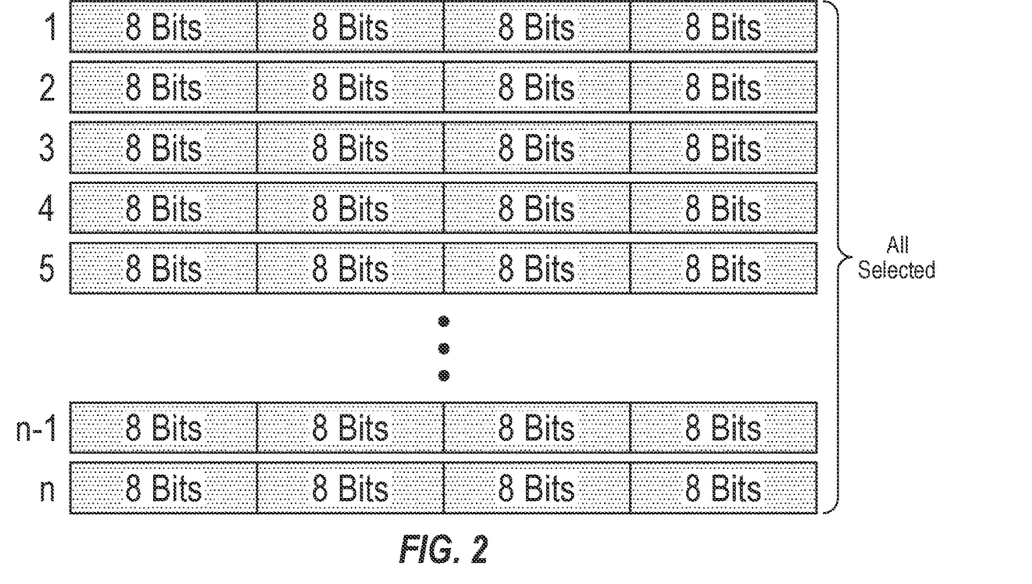
FIGS. 2 and 3 show a set of bytes organized in rows with different sets of bytes used for file authentication, in accordance with various embodiments of the disclosure.

FIG. 2 shows a set of data segments (e.g., bytes, each including 8 bits) organized in rows 1 to n (with each row also referred to as "words"). In this example, a microcontroller (e.g., microcontroller 110 of FIG. 1) may include a 32-bit microcontroller that organizes the computer file into n words, wherein each word includes four data segments. In this example, each data segment may be one byte (e.g., 8 bits) in length. Other arrangements and sizes are also contemplated.

Figure 3:
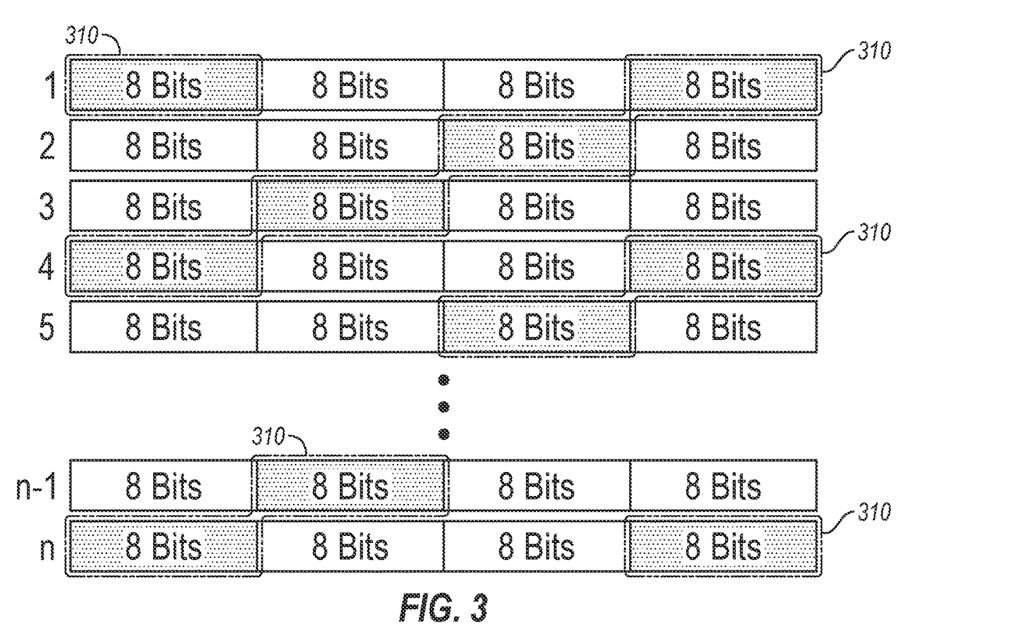

According to various embodiments of the disclosure, instead of selecting all data segments (e.g., bytes), as shown in FIG. 2, a subset of the data segments may be selected, as shown in FIG. 3, wherein the selected data segments are indicated by reference numeral 310. More specifically, for example, in the set of data segments shown in FIG. 3, every third data segment (e.g., byte) is selected (e.g., based on a repeatable pattern) for authentication. Thus, in the example of FIG. 3, the first and fourth data segments of row 1 may be selected, the third data segment of row 2 may be selected, the second byte of row 3 may be selected, the first and fourth bytes of row 4 may be selected, and so on. Thus, various embodiments may perform the cryptographic function for a repeatable pattern of data segments, such as every other byte, every third byte, every fourth byte, without limitation. In some embodiments, the microcontroller 110 may be configured to execute a deterministic algorithm to select the data segments (e.g., bytes) to be hashed.

In other embodiments, the subset of data segments (e.g., bytes) may be selected according to a random (e.g., pseudorandom) distribution of the data segments. For example, a random number may be generated (e.g., a random 32-bit number) that is used to select which data segments are used to generate the digest. In such an example, the 32-bit number may be a binary number (e.g., 10010001100011101010110011001111) in which each bit of the random number corresponds to one of the bytes in that repeatable pattern throughout the computer file. For example, each logical 1 may correspond to a byte that is included in the hash, whereas each logical 0 may correspond to a byte that is not included in the hash. Of course, some embodiments may utilize a logical 0 to represent bytes that are to be hashed and a logical 1 to represent bytes that are not to be hashed.

If 't' equals the amount of time needed to add a byte to a hash digest and 'n' equals the number of words, the time needed for a complete (i.e., every byte) hash of an application image for a 32-bit processor may be 4 nt. The time needed for a subset including only every fourth byte of the application image for a 32-bit processor is only 4 nt/4. Thus, if every fourth byte were hashed, the time needed to generate the digest may be reduced by 75%, yet security is maintained because it may be infeasible to significantly modify such a small amount of the application image. If every third byte were hashed, the time needed to generate the digest may be reduced by 67%. If half of the bytes were hashed, the time reduction may be 50%. In larger systems (e.g., including 512 or 1K blocks with 32-bit words within the blocks), selecting an address aligned 32-bit word may be significantly faster than extracting a byte from a 32-bit word.

In at least some embodiments, a determination for selecting data segments (e.g., to be hashed) may be based, at least in part, on contents about the computer file. For example, certain critical data embedded in the code of a computer file may be flagged and considered to be specifically selected for being hashed. For example, certain areas of data space in the computer file may be designated to hash all bytes, whereas in other areas of the computer file only a subset of bytes may be designated. Combinations of each of these approaches are also contemplated and within the scope of the disclosure.

For a computer file (e.g., application image), for example, embodiments of the disclosure may sufficiently authenticate a computer file, and any modification of the computer file (e.g., by an untrusted party) may be detected. Various embodiments may reduce the amount of time needed to hash a computer file to achieve a valid representation of the computer file in comparison to performing a hash on the entire computer file. Because the selected data segments (e.g., bytes) are typically interdependent when part of a computer file (e.g., an application image), a subset of the computer file may be selected such that it may be infeasible to significantly alter the code without detection. Thus, a similar level of security in comparison to conventional authentication approaches may be achieved.

Figure 4:
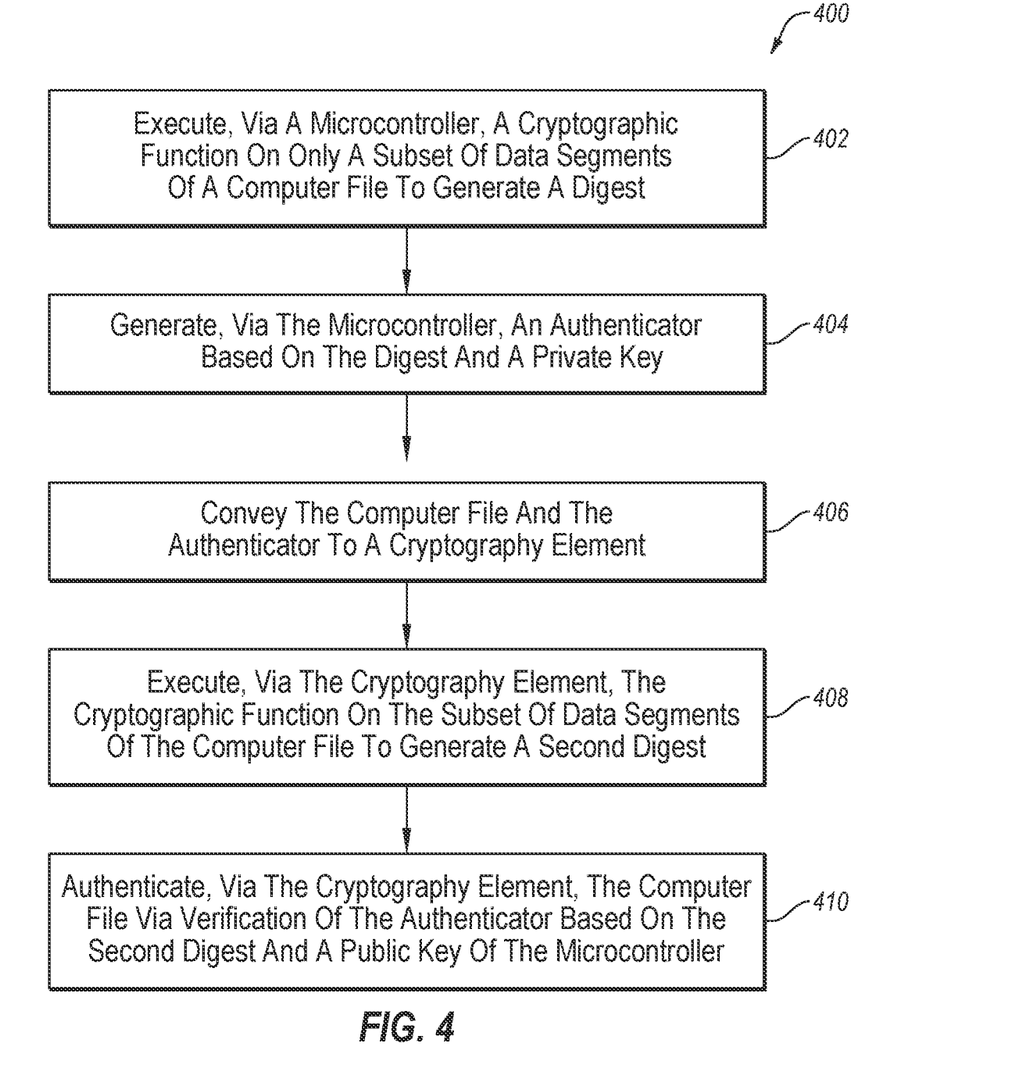
FIG. 4 illustrates an example flow diagram of a method of authenticating a file, according to one or more embodiments of the disclosure.

FIG. 4 is a flowchart of an example method 400 of authenticating a computer file. The method 400 may be arranged in accordance with at least one embodiment described in the present disclosure. The method 400 may be performed, in some embodiments, by a device or system, such as the system 100 of FIG. 1, a system 500 (see FIG. 5), one or more of the components thereof, or another system or device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a first digest may be generated via execution of a cryptographic function on only a subset of data segments of a computer file, and the method 400 may proceed to block 404. For example, the computer file 112 (see FIG. 1) may include an application image including a number of data segments (e.g., a number of bytes), and the first digest 121 may be generated via hashing a subset (e.g., inter-alia every $3^{rd}$ segment or every $4^{th}$ segment, without limitation) of the number of data segments of the computer file 112. Further, for example, the first digest 121 may be generated via the microcontroller 110 of FIG. 1. For example, a processor, such as the processor 510 of FIG. 5, may generate the first digest 121.

At block 404, an authenticator may be generated based on the first digest, and the method 400 may proceed to block 406. For example, the authenticator 122, which may include, for example, a MAC and/or a digital signature of the microcontroller 110 of FIG. 1, may be generated via the microcontroller 110. By way of example, a processor, such as the processor 510 of FIG. 5, may generate the authenticator.

According to some embodiments, the acts of block 402 and/or block 404 may be performed by, for example, one or more designers (e.g., firmware and/or software designers) preparing the computer file (e.g., to be sent out the field).

At block 406, the computer file and the authenticator may be conveyed to a cryptography element, and the method 400 may proceed to block 408. For example, the computer file 112 and the authenticator 122 (e.g., a digital signature) may be conveyed from the microcontroller 110 to the cryptography element 120 (see FIG. 1).

At block 408, a second digest may be generated via execution of the cryptographic function on only the subset of data segments of the conveyed computer file 112, and the method 400 may proceed to block 410. For example, the cryptography element 120 may hash the same subset of data segments of the computer file (e.g., application image) 112 to generate the second digest 124. For example, a processor, such as the processor 510 of FIG. 5, may generate the second digest 124.

At block 410, the conveyed computer file 112 may be authenticated via verification of the authenticator based on the second digest 124 and a public key. For example, the cryptography element 120 may verify the conveyed authenticator 122 based on the second digest 124 and the public key 126 of the microcontroller 110 to authenticate the conveyed computer file 112. For example, a processor, such as the processor 510 of FIG. 5, may authenticate the computer file.

In some embodiments, an authenticator received at the cryptography element 120 may be stored and used for, for example, a secure boot. Further, for example, after a new firmware is accepted, during a secure boot, the acts of blocks 408 and 410 may be performed to verify the stored authenticator.

Modifications, additions, or omissions may be made to the method 400 without departing from the scope of the present disclosure. For example, the operations of the method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, the subset of data segments may be determined and/or selected and, in some embodiments, another subset of data segments of the computer file not to use for the cryptographic function may be determined and/or selected. Further, for example, an identifier may be determined, and the subset of data segments may be selected and/or determined based on the identifier. More specifically, the identifier, which may be indicative of, inter-alia, a repeatable pattern, a random number or an algorithm, without limitation, may be used to determine and/or select the subset of data segments for authentication. Further, in some embodiments, the identifier may be sent (e.g., along with the computer file 112 and the authenticator 122) from microcontroller 110 to cryptography element 120.

Figure 5:
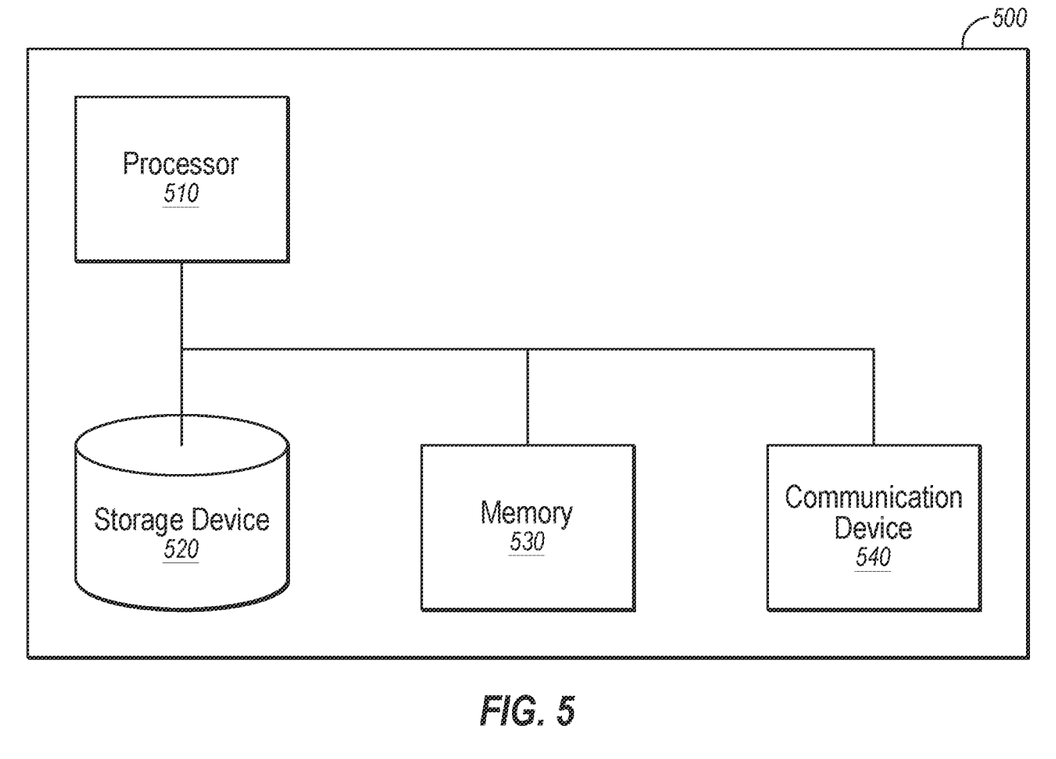
FIG. 5 is a block diagram of an example computing system.

FIG. 5 illustrates an example system 500, according to at least one embodiment described herein. The system 500 may include any suitable system, apparatus, or device configured for authenticating a file. The system 500 may include a processor 510, a memory 530, a data storage 520, and a communication device 540, which all may be communicatively coupled. The data storage 520 may include various types of data, such as public and private keys, authenticators, cryptographic functions, digests and/or other data associated with authenticating a file.

Generally, the processor 510 may include any suitable special-purpose or general-purpose computer, computing entity, or processing device including various computer hardware or software modules and may be configured to execute instructions stored on any applicable computer-readable storage media, particularly on memory 530. For example, the processor 510 may include a microprocessor, a digital signal processor (DSP), an application-specific integrated circuit (ASIC), a Field-Programmable Gate Array (FPGA), or any other digital or analog circuitry configured to interpret and/or to execute program instructions and/or to process data. In some embodiments, processor 510 may be part of microcontroller 110 and/or device 120 (see FIG. 1).

Although illustrated as a single processor in FIG. 5, it is understood that the processor 510 may include any number of processors distributed across any number of network or physical locations that are configured to perform individually or collectively any number of operations described herein. In some embodiments, the processor 510 may interpret and/or execute program instructions and/or process data stored in the memory 530, the data storage 520, or the memory 530 and the data storage 520. In some embodiments, the processor 510 may fetch program instructions from the data storage 520 and load the program instructions into the memory 530.

After the program instructions are loaded into the memory 530, the processor 510 may execute the program instructions, such as instructions to perform one or more blocks of the method 400 as described herein. For example, the processor 510 may select, via an identifier, a subset of data segments of a computer file. Further, the processor 510 may execute a cryptographic function on only the subset of data segments of the computer file to generate a first digest. Further, the processor 510 may generate an authenticator based on the first digest and a private key. Moreover, the processor 510 may execute the cryptographic function on the subset of data segments of the computer file to generate a second digest. Additionally, the processor 510 may authenticate the computer file via verification of the authenticator based on the second digest and a public key.

The memory 530 and the data storage 520 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication device 540 may include any component, device, system, or combination thereof that is configured to transmit or receive information over a network. In some embodiments, the communication device 540 may communicate with other devices at other locations, the same location, or even other components within the same system. For example, the communication device 540 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 540 may permit data to be exchanged with a network and/or any other devices or systems described in the present disclosure. For example, the communication device 540 may allow the system 500 to communicate with other systems and/or devices.

Modifications, additions, or omissions may be made to the system 500 without departing from the scope of the present disclosure. For example, the data storage 520 may be multiple different storage mediums located in multiple locations and accessed by the processor 510 through a network.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 530 or the data storage 520 of FIG. 5) for carrying or having computer-executable instructions or data structures stored thereon.

As used herein, the terms "module" or "component" may refer to specific hardware implementations configured to perform the operations of the module or component and/or software objects or software routines that may be stored on and/or executed by, for example, the system 100 of FIG. 1, and/or the computing system 500 of FIG. 5. In some embodiments, the different components and modules described herein may be implemented as objects or processes that execute on a computing system (e.g., as separate threads). While some of the system and methods described herein are generally described as being implemented in software (stored on and/or executed by the system 500), specific hardware implementations or a combination of software and specific hardware implementations are also possible and contemplated. In this description, a "computing entity" may include any computing system as defined herein, or any module or combination of modules running on a computing system, such as the system 500.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

What is claimed is:

1. A system, comprising:
one or more physical devices to:
determine a subset selection identifier, said subset selection identifier to identify how a subset of data segments of a computer file is selected, upon determining an identification of a repeatable pattern of data segments of the computer file in a form of one (1) data segment selected for every N data segments, wherein N is a positive integer;

select, via the subset selection identifier, the subset of data segments of the computer file for generating a first digest with a cryptographic function;

execute the cryptographic function on the selected subset of data segments of the computer file to generate the first digest, which said first digest is signed by a private key;

generate an authenticator using the first digest and the private key; and send the computer file, the subset selection identifier, and the authenticator to a same secure node.

2. The system of claim 1, further comprising the secure node, the secure node to:

receive the computer file, the subset selection identifier, and the authenticator;

determine the subset of data segments of the computer file based on the subset selection identifier;

execute the cryptographic function on the subset of data segments of the computer file to generate a second digest; and authenticate the computer file via verification of the authenticator based on the second digest and a public key.

3. The system of claim 1, wherein the subset selection identifier identifies a pseudorandom distribution of data segments of the computer file.

4. The system of claim 1, wherein the subset selection identifier includes, or is determined via, an algorithm.

5. The system of claim 1, wherein the subset selection identifier includes, or is determined by, a randomly generated number.

6. The system of claim 5, wherein the randomly generated number is represented by a binary number, wherein each bit of the binary number corresponds to a data segment within either the subset of data segments or another subset of data segments of the computer file not selected for generating the first digest.

7. The system of claim 1, wherein the one or more physical devices are to select the subset of data segments of the computer file based on contents of the computer file.

8. A method, comprising:

determining a subset selection identifier, the subset selection identifier to identify how a subset of data segments of a computer file is selected, upon determining a repeatable pattern of data segments of the computer file in a form of one (1) data segment selected for every N data segments, wherein N is a positive integer;

selecting, via the subset selection identifier, the subset of data segments of the computer file;

executing a cryptographic function on only the subset of data segments of the computer file to generate a first digest, which said first digest is signed by a private key;

generating an authenticator using the first digest and the private key; and conveying the computer file, the subset selection identifier, and the authenticator to a same cryptography element.

9. The method of claim 8, further comprising;

executing, via the cryptography element, the cryptographic function on the subset of data segments of the computer file to generate a second digest; and authenticating, via the cryptography element, the computer file via verification of the authenticator based on the second digest and a public key.

10. The method of claim 8, wherein the determining the subset selection identifier comprises determining the subset selection identifier via one of an algorithm and a randomly generated number.

11. A non-transitory machine-readable medium storing instructions that, in response to being executed by at least one processor of a system, are to enable the system to perform operations comprising:

determining a subset selection identifier, the subset selection identifier to identify how a subset of data segments of a computer file is selected, upon determining a repeatable pattern of data segments of the computer file in a form of one (1) data segment selected for every N data segments, wherein N is a positive integer;

selecting, via the subset selection identifier, the subset of data segments of the computer file;

executing a cryptographic function on only the subset of data segments of the computer file to generate a first digest, which said first digest is signed by a private key;

generating an authenticator using the first digest and the private key; and conveying, via a secure message, at least the subset of data segments, the subset selection identifier, and the authenticator to a same secure node.

12. The non-transitory machine-readable medium of claim 11, further comprising:

executing a second hash operation on the subset of data segments of the computer file to generate a second digest; and authenticating the computer file via verification of the authenticator using the second digest and a public key.

13. The non-transitory machine-readable medium of claim 12, wherein the executing the second hash operation comprises executing the second hash operation on a secure cryptography element.

14. The non-transitory machine-readable medium of claim 11, the operations further comprising determining the subset selection identifier based on at least one of a repeatable pattern, a random number, or an algorithm.

15. The non-transitory machine-readable medium of claim 11, wherein the executing the cryptographic function comprises executing a hash operation on a microcontroller.

16. The non-transitory machine-readable medium of claim 11, wherein the executing the cryptographic function comprises executing the cryptographic function responsive to at least one of a firmware update or a secure boot up.

* * * * *